United States Patent [19]

Meisel, Jr.

[11] 4,222,578
[45] Sep. 16, 1980

[54] TANDEM WHEEL PROPORTIONING ARRANGEMENT

[75] Inventor: Thomas C. Meisel, Jr., Peoria, Ill.

[73] Assignee: Caterpillar Tractor Co., Peoria, Ill.

[21] Appl. No.: 883,603

[22] Filed: Mar. 6, 1978

[51] Int. Cl.$^2$ .......................................... B60G 17/00
[52] U.S. Cl. ............................. 280/6.11; 180/24.02; 267/11 A; 280/683; 280/704; 280/714
[58] Field of Search ............. 280/676, 677, 678, 682, 280/683, 693, 714, 708, 704, 6 H, 6.11; 180/22, 24.02, 24.03, 24.05, 24.11, 24.13; 267/11 R, 11 A

[56] References Cited

U.S. PATENT DOCUMENTS

| | | | |
|---|---|---|---|
| 3,039,789 | 6/1962 | Schnuerle | 280/678 |
| 3,441,102 | 4/1969 | Kress | 280/683 |
| 3,871,635 | 3/1975 | Unruh | 267/11 |
| 3,953,040 | 4/1976 | Unruh | 280/6 H |
| 3,966,222 | 6/1976 | Felburn | 280/685 |
| 3,970,327 | 7/1976 | Dezelan | 280/683 |
| 3,977,694 | 8/1976 | Nordstrom | 280/112 A |
| 4,047,736 | 9/1977 | Prive | 280/683 |
| 4,090,723 | 5/1978 | Hart | 280/6.11 X |

*Primary Examiner*—John P. Silverstrim
*Attorney, Agent, or Firm*—Phillips, Moore, Weissenberger, Lempio & Majestic

[57] ABSTRACT

The invention relates to a tandem wheel arrangement for construction vehicles, such as a motor grader. Most particularly the invention relates to such an arrangement wherein both the forward and rearward wheels of the tandem wheel arrangement are mounted to levers and the levers are mounted to the vehicle frame. For example, when one of the roadwheels becomes elevated relative to the other when such roadwheel runs over a rock, a fluid circuit including cylinders interconnected between the vehicle frame and the levers, functions to change the lever relationship between the ascending and descending roadwheels such that the resistance to upward motion of the ascending wheel is reduced, a lowering force is imposed on the descending wheel to increase tractive effort thereof and the upward movement of the frame is reduced.

10 Claims, 6 Drawing Figures

TANDEM WHEEL PROPORTIONING ARRANGEMENT

BACKGROUND OF THE INVENTION

1. Field of the Invention

The invention relates to tandem wheel arrangements for vehicles. Such arrangements are particularly useful in off-road vehicles such as motor graders, off-highway trucks and the like. More particularly, the invention is concerned with such a tandem wheel arrangement wherein force exerted upon one of the tandem wheels is partially transmitted to the other thereof to apply reduced wheel loading to the wheel at a higher elevation while simultaneously applying greater wheel loading to the wheel at a relatively lower elevation and to reduce the upward displacement of the vehicle.

2. Prior Art

In prior art tandem wheel arrangements a problem has existed when one of the wheels is forced to a different elevation than the other. The problem mainly occurs when a motor grader is run over a semi-prepared roadbed or the like, and when one of the wheels moves upwardly as it encounters a bump or the like while the elevation of the other wheel remains unchanged. Relatively heavy transient wheel loading is thus imposed on the wheel which is at a relatively higher elevation. As a result, additional vehicle power is needed to motivate the vehicle. Further, the total machine displacement as each of the tandem pair of wheels goes over an obstacle such as a bump is relatively large, i.e., equal to one-half of the height of the obstacle, which leads to a very rough ride for an operator of the vehicle. Further, the resultant tilting of the vehice frame leads to the development of relatively large stresses therein.

Yet another problem occurs with vehicles in that one side of the vehicle may be at a lower elevation than the other side thereof. In such a situation the operator of the vehicle is at a considerable angle to the horizontal thus causing excessive operator fatigue. Accordingly, it is desirable to be able to provide height adjustment of one side of the vehicle relative to the other. While the prior art in some instances provides such height adjusting, it has not heretofore been provided in a vehicle which included means for proportioning the load between the two tandem wheels on one side of a vehicle.

SUMMARY OF THE INVENTION

The present invention is directed to overcoming one or more of the problems as set forth above.

According to the present invention an improvement is provided in a tandem wheel arrangement comprising a first and a second lever each pivotally mounted to a vehicle at first and second pivots, respectively, the first and second pivots having generally horizontal axes generally perpendicular to the vehicle, the levers extending from a side of the vehicle and being spaced longitudinally from one another, first and second roadwheels being mounted for rotation respectively to the first and second levers at positions longitudinally spaced from the respective pivots. The improvement of the invention comprises main first and second cylinder means with the main first cylinder means being attached between the vehicle and the first lever at a position spaced from the first pivot and the main second cylinder means being likewise attached to the second lever. Means are provided, responsive to a force which creates a moment to pivot the first lever or the second lever in a first rotational direction, for transferring a portion of said force to the other of the first and second levers to create a moment thereat in the first direction.

BRIEF DESCRIPTION OF THE DRAWING

The invention will be better understood by reference to the figures of the drawings wherein like numbers denote like parts throughout and wherein.

DETAILED DESCRIPTION OF THE PREFERRED EMBODIMENTS

Figure 1:
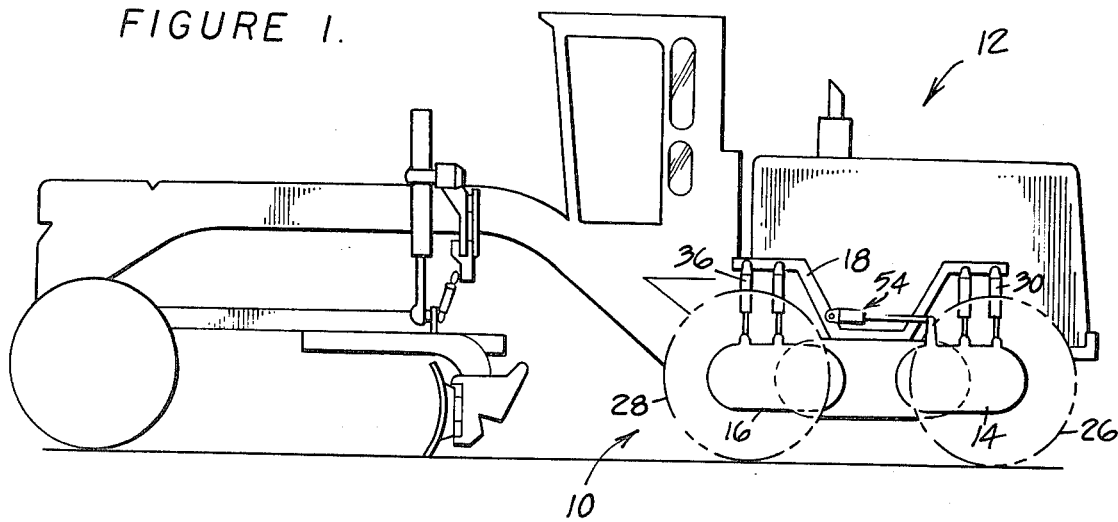
FIG. 1 illustrates in side elevation a motor grader equipped in accordance with the present invention.
Figure 2:
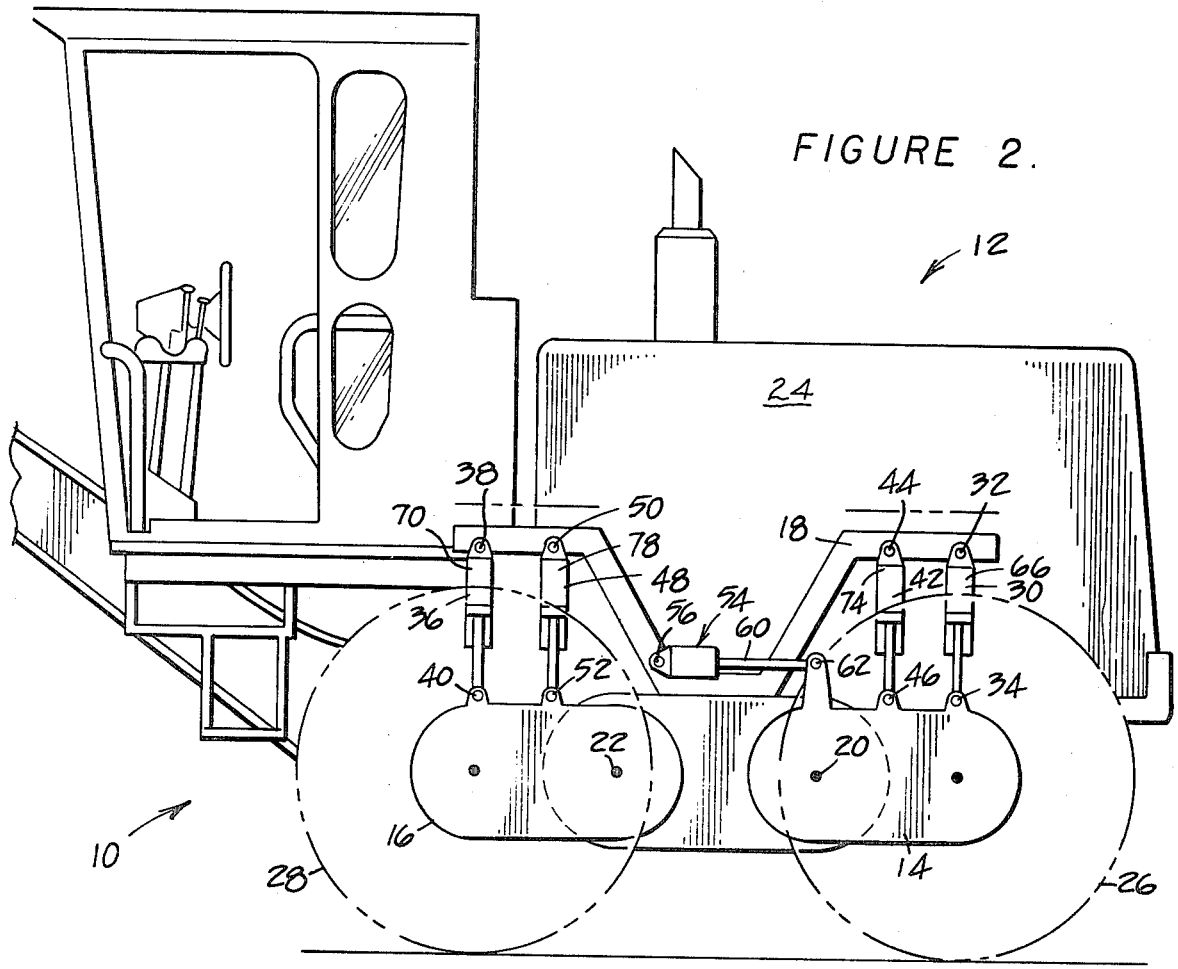
FIG. 2 illustrates in partial side elevation, partially in section, an improved tandem wheel load proportioning arrangement in accordance with the present invention.
Figure 3:
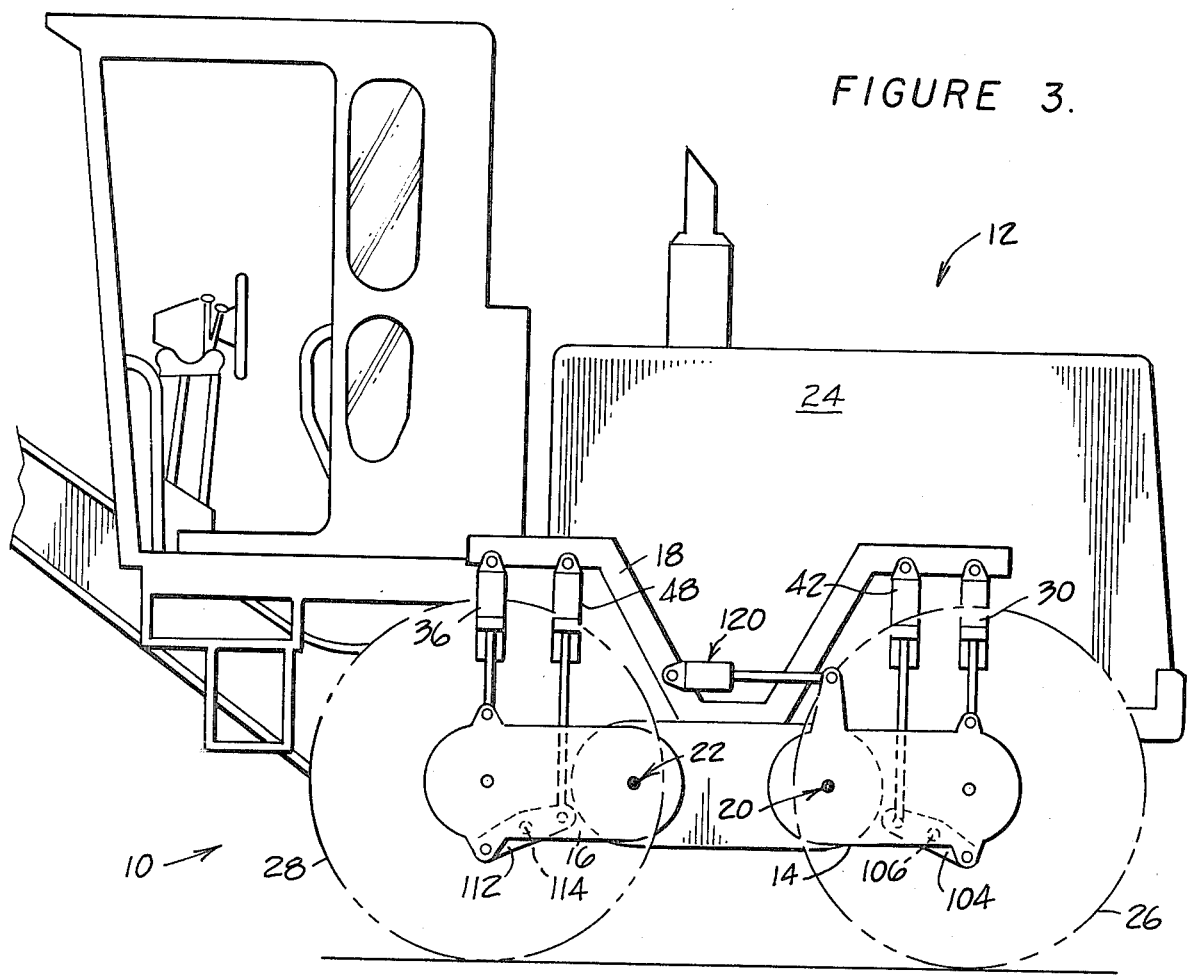
FIG. 3 illustrates in partial side elevation, partially in section, an alternate embodiment of a tandem wheel load proportioning arrangement in accordance with the present invention.

Adverting to the figures of the drawing, and primarily to FIGS. 1, 2 and 3, there is illustrated therein a tandem wheel arrangement 10 of a motor grader vehicle 12. A first lever 14 and a second lever 16 are each pivotally mounted in a conventional manner to a frame 18 of the vehicle 12. The first lever 14 is mounted at a first pivot 20 while the second lever 16 is mounted at a second pivot 22. If desired, the first and second pivots 20 and 22 can be coaxial. It will be noted that the first and second pivots have their generally horizontal axes disposed generally perpendicular to the longitudinal axis of the frame 18. The levers 14 and 16 extend from a side 24 of the vehicle 12 and are spaced longitudinally from one another therealong. A first roadwheel 26 is mounted for rotation to the first lever 14 and a second roadwheel 28 is mounted for rotation to the second lever 16. At least one of first and second roadwheels 26 and 28 is driven. The mounting of each of the roadwheels 26 and 28 is longitudinally spaced from the respective lever pivot 20 or 22. An identical tandem wheel arrangement is located on the opposite side of the vehicle 12. Thus the discussion which follows will be understood to refer also to the identical tandem wheel arrangement on the opposite side of the vehicle 12.

Figure 4:
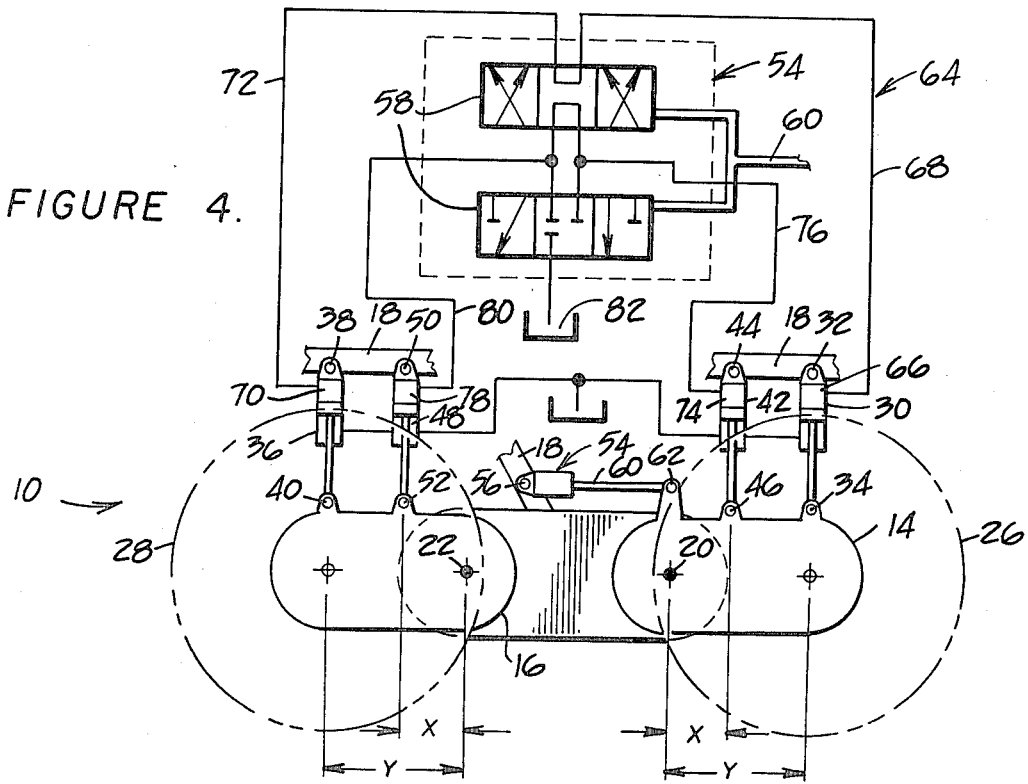
FIG. 4 illustrates schematically the embodiment as shown in FIG. 2.

Referring now primarily to FIGS. 2 and 4, it will be seen that in the embodiment of these figures the improved tandem wheel arrangement 10 of the present invention will include a generally vertically extending main first cylinder 30 along with means for attaching the first main cylinder 30 to extend from the vehicle 12 to the first lever 14. In the embodiment illustrated said attaching means simply comprises a pin 32 attached to the frame 18 and a pin 34 attached to the lever 14, preferably disposed in vertical alignment with the wheel pivotal mounting point. Further, in accordance with the present invention there is provided a generally vertically extending main second cylinder 36 along with means for attaching the main second cylinder to extend from the vehicle 12 to the second lever 16 at a position spaced from the second lever pivot 22. In the embodiment illustrated the attaching means simply comprises a pin 38 attached to the frame 18 and a pin 40 attached to the second lever 16, preferably disposed in vertical alignment with the wheel pivotal mounting point.

Figure 5:
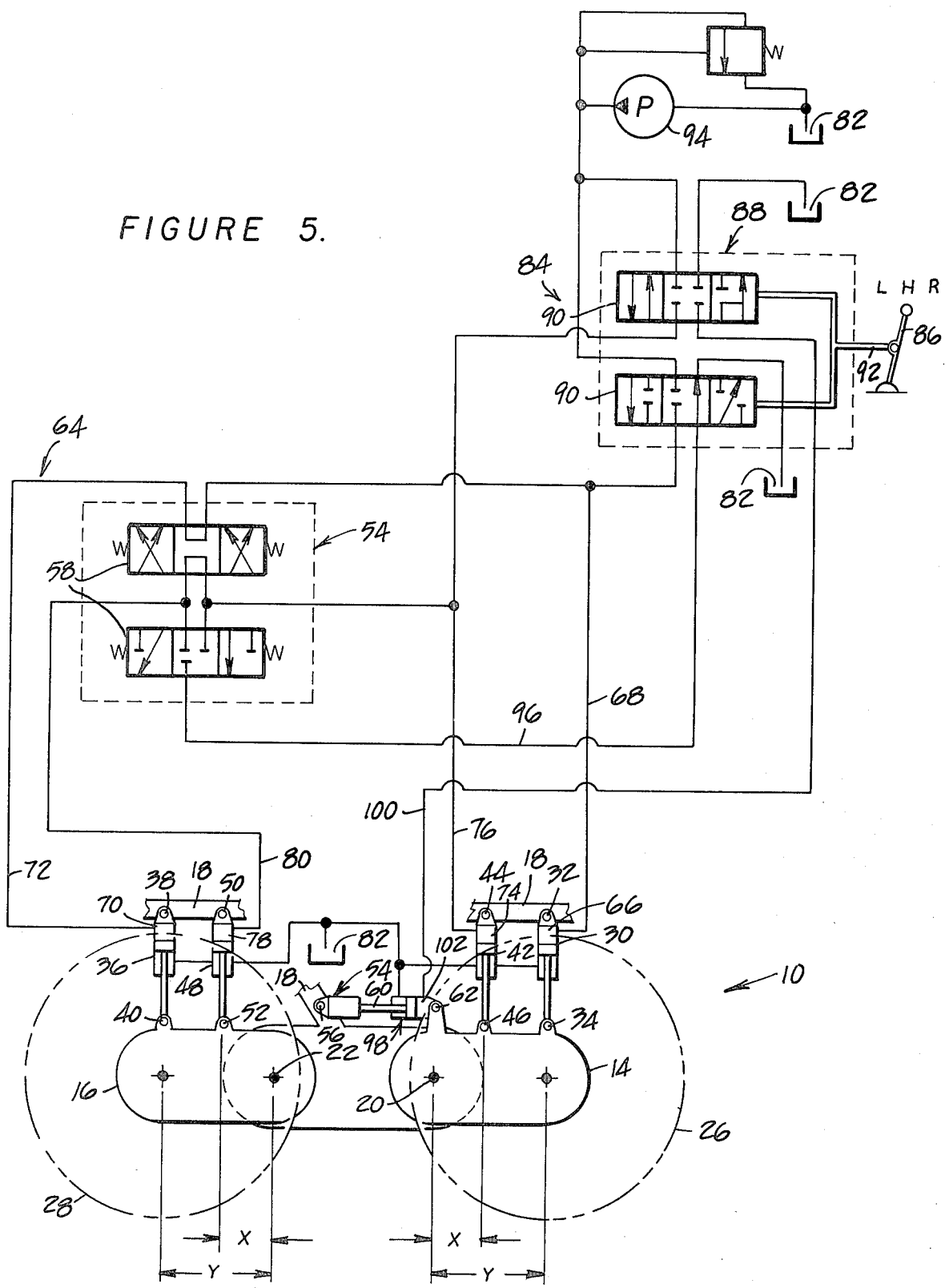
FIG. 5 illustrates an embodiment as shown in FIG. 2 which further includes vehicle levelling means.

Means is provided which, responsive to a moment exerted to pivot either the first lever 14 or the second lever 16 in a first rotational direction, serve for transferring a portion of said moment to a respective other of said levers to pivot said respective other lever in said first rotational direction. This increases the tractive load on the relatively lower roadwheel while reducing upward movement of the frame 18 relative to ground level. In the embodiments illustrated in FIGS. 2, 4 and 5 this moment responsive means comprises a generally vertically extending auxiliary first cylinder 42 along with means for attaching the auxiliary first cylinder to extend from the vehicle 12 to the first lever 14 at a position intermediate the first lever pivot 20 and the position of attachment of the main first cylinder 30. The attaching means in the embodiment illustrated in FIGS. 2, 4 and 5 comprises a pin 44 to the frame 18 and a pin 46 to the first lever 14. The moment transferring means in accordance with the embodiment of FIGS. 2, 4 and 5 also includes a generally vertically extending auxiliary second cylinder 48 along with means for attaching the auxiliary second cylinder to extend from the vehicle 12 to the second lever 16 at a position intermediate the second lever pivot 22 and to the point of attachment of the main second cylinder 36. In the embodiments of FIGS. 2, 4 and 5 the attaching means comprises a pin 50 to the frame 18 and a pin 52 to the second lever 16.

It should be noted (FIGS. 4 and 5) that the auxiliary first cylinder 42 and the auxiliary second cylinder 48 each operate at a distance, X, from the respective pivots 20, 22 while the main first and second cylinders 30 and 36 operate at a distance, Y, from the same pivots 20 and 22. In this manner, and as will become more apparent from reading the following portions of the specification, any forces transmitted from, for example, the main first cylinder 30 to the auxiliary second cylinder 48 will be reduced by the ratio of the lever arms X to Y, any force transmitted from the auxiliary first cylinder 42 to the main second cylinder 36 will be increased by the ratio of the lever arms Y to X, etc.

Still further in accordance with the embodiments illustrated in FIGS. 2, 4 and 5, there is provided a load proportioning valve 54 which is shown mounted to the vehicle frame 18 at a pin 56. The valve 54 is shown in FIGS. 2, 4 and 5 in both it's preferred structural location and in schematic view to illustrate it's operation. The spool or spools 58 of the load proportioning valve 54 connect via a rod 60 to a pivot 62 which extends to form a crank from the lever 14. It will be clear that as the first roadwheel 26 and with it the lever 14 rotate in a clockwise direction about the first lever pivot 20, the rod 60 will be pulled rightwardly whereby the spools 58 will shift rightwardly. Similarly, as the first roadwheel 26 moves in a counterclockwise direction the rod 60 will be forced leftwardly whereby the spool 58 will move leftwardly. It should be noted that in a manner which will become apparent from the soon to follow description of the hydraulic interconnections accomplished via the load proportioning valve 54, a clockwise motion of the second lever 16, caused for example by the left wheel 28 moving over a bump, will be transmitted via the load proportioning valve 54 in such a manner to the first lever 14 as to cause precisely the same movement of the rod 60 as is caused by the right wheel 26 passing into a depression.

A hydraulic system 64 as illustrated in FIGS. 4 and 5 will now be discussed in detail. An expansion end 66 of the main first cylinder 30 communicates via a conduit 68 with the load proportioning valve 54. Similarly, an expansion end 70 of the main second cylinder 36 communicates via a conduit 72 with the load proportioning valve 54. In the same manner, an expansion end 74 of the auxiliary first cylinder 42 communicates via a conduit 76 and an expansion end 78 of the auxiliary second cylinder 48 communicates via a conduit 80 with the load proportioning valve 54. With the load proportioning valve 54 centered as illustrated in FIGS. 4 and 5, which corresponds to the first roadwheel 26 and the second roadwheel 28 being substantially level, the expansion end 66 of the main first cylinder 30 and the expansion end 70 of the main second cylinder 36 are in flow communication with one another via the load proportioning valve 54. At the same time, the expansion end 74 of the auxiliary first cylinder 42 and the expansion end 78 of the auxiliary second cylinder 48 are in flow communication with one another via the load proportioning valve 54. This then is the connection which prevails when neither the first wheel 26 nor the second wheel 28 is going over a rock or in a depression.

In instances wherein the first roadwheel 26 is elevated relative to the second roadwheel 28, as when the first roadwheel 26 goes over a bump or the second roadwheel 28 goes into a depression, the rod 60 is moved leftwardly thus shifting the spool 58 leftwardly whereby the expansion end 66 of the first main cylinder 30 and the expansion end 78 of the auxiliary second cylinder 48 are communicated via the load proportioning valve 54 with a sump 82. At the same time, the expansion end 74 of the auxiliary first cylinder 42 and the expansion end 70 of the second main cylinder 36 are placed in fluid flow communication with each other via the load proportioning valve 54. Thus it will be noted that any force exerted in a counterclockwise direction upon the first roadwheel 26 is transmitted via the hydraulic system 64 partially into a counterclockwise rotational force upon the second roadwheel 28. Also, it will be noted that a force acting upon the first roadwheel 26 will act through a lever arm, X, while a force acting upon the second roadwheel 28 will act through a lever arm, Y, whereby the ratio of the force exerted upon the second roadwheel 28 to that exerted upon the first roadwheel 26 is generally in the ratio of Y to X. This allows the first roadwheel 26 to easily travel over a bump or the like while desirably increasing traction of the second roadwheel 28.

Turning next to a consideration of a situation wherein the first roadwheel 26 moves in a clockwise direction, as for example by its moving into a depression or, equivalently, when the second roadwheel 28 moves over a bump or the like, it will be noted that the rod 60 is thereby shifted rightwardly carrying the spools 58 therewith. With the spools 58 shifted rightwardly the expansion end 66 of the main first cylinder 30 and the expansion end 78 of the auxiliary rear cylinder 48 are placed in flow communication with one another via the load proportioning valve 54. At the same time, the expansion end 74 of the auxiliary first cylinder 42 and the expansion end 70 of the main second cylinder 36 are connected via the load proportioning valve 54 with the sump 82. The second roadwheel 28 will thereby be pushed upwardly (clockwise) with a force having a ratio of X to Y of the force acting in a clockwise direction downwardly upon the first roadwheel 26. Also the downward force upon the first roadwheel 26 will advantageously increase the traction thereat when th first roadwheel 26 is driven.

It will be clear that any force exerted upon the second roadwheel 28 will be converted via the hydraulic system 64 to an equivalent action upon the first roadwheel 26. That is, if the second roadwheel 28 is pushed in a clockwise direction as by rolling over a bump, the hydraulic system 64 will translate this to the exact equivalent of the first roadwheel 26 going into a depression. In other words, the first roadwheel 26 will be forced to move in a clockwise direction which will thereby move the rod 60 and thus the spools 58 rightwardly. Similarly, if the second roadwheel 28 moves into a depression, this will be translated via the hydraulic system 64 to an upward or counterclockwise force upon the first roadwheel 26 whereby the rod 60 will be forced leftwardly thus forcing the spools 58 leftwardly.

Vehicle Levelling Embodiment

Adverting now to FIG. 5, there is illustrated an embodiment which includes vehicle levelling means 84. The vehicle levelling means 84 is adjustable by a movement of a control lever 86 to lower or raise a side of the vehicle 12. The control lever 86 is also positionable in a "HOLD" position wherein the load proportioning valve 54 operates identically with the embodiment shown in FIGS. 2 and 4. In FIG. 5, the control lever 86 is shown in this hold position. The vehicle levelling means 84 comprises a levelling valve 88 having a spool or spools 90 motivated by the control lever 86 via a linkage 92. With the levelling valve 88 in the position illustrated in FIG. 5, a pump 94 which is arranged to pump fluid from the sump 82 is blocked off from the hydraulic system 64. The sump 82 is reached from the load proportioning valve 54 via a conduit 96 and a lowermost of the spools 90. When the control lever 86 is moved leftwardly to the "LOWER" position each of the spools 90 moves leftwardly. The pump 94 remains blocked and cannot deliver any fluid from the sump 82. However, the expansion end 66 of the main first cylinder 30 communicates via the conduit 68 and the lowermost of the spools 90 with the sump 82. Similarly, the head end 70 of the main second cylinder 36 communicates via the conduit 72, the uppermost of the spools 58 and the lowermost of the spools 90 with the sump 82. Still further, the expansion end 74 of the auxiliary first cylinder 42 and the expansion end 78 of the auxiliary second cylinder 48 communicate respectively via the conduits 76 and 80 and the uppermost of the spools 90 with the sump 82. What happens overall then is a leakage of hydraulic fluid from the expansion ends of each of the cylinders to the sump. In the embodiment illustrated in FIG. 5 it will be noted that an adjusting cylinder 98 is added between the rod 60 and the first lever 14. A conduit 100 communicates an expansion end 102 of the rod adjusting cylinder 98 to the uppermost of the spools 90. With the control lever 86 in the LOWER position it will be noted that the conduit 100 communicates via the uppermost of the spools 90 with the sump 82. Thus the adjusting cylinder 98 can freely extend or contract while the load proportioning valve 54 remains centered. When the control lever 86 is returned to the HOLD position the adjusting cylinder 98 is not connected with the sump 82 or with the pump 94 and a new center position is established for the load proportioning valve 54.

When the control lever 86 is moved to the "RAISE" position, the pump 94 delivers fluid from the sump 82 via the uppermost of the spools 90 to the expansion end 74 of the auxiliary first cylinder 42 and the expansion end 78 of the auxiliary second cylinder 48 and at the same time delivers fluid via the lowermost of the spools 90 to the expansion end 66 of the main first cylinder 30 and the expansion end 70 of the main second cylinder 36. At the same time, expansion end 102 of the adjusting cylinder 98 communicates via the conduit 100 and the uppermost of the spools 90 with the sump 82. This again allows the adjusting cylinder 98 to expand or contract and establish a new center position for the load proportioning valve 54.

Figure 6:
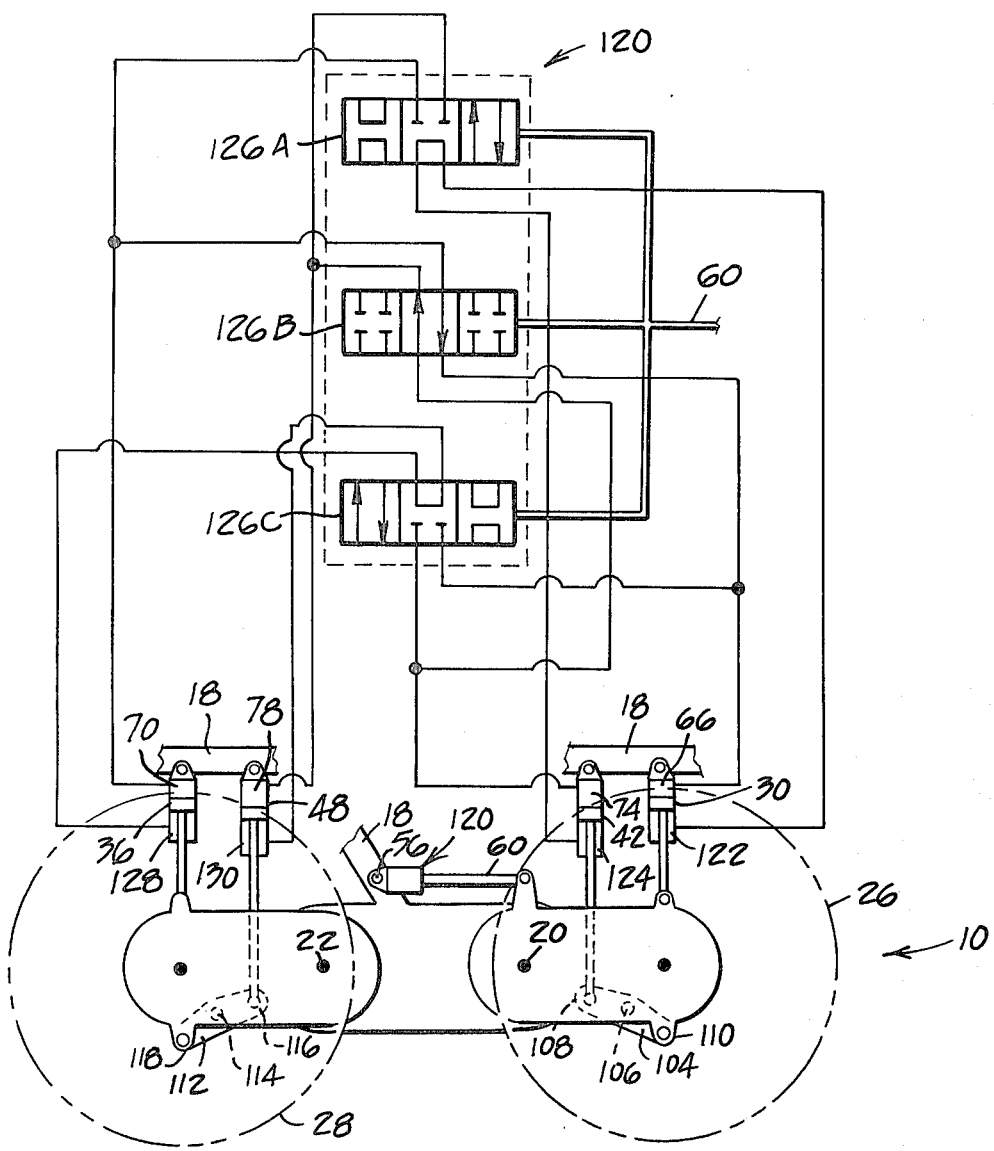
FIG. 6 illustrates schematically an embodiment in accordance with FIG. 3.

The Embodiment of FIGS. 3 and 6

Adverting now to FIGS. 3 and 6, there is illustrated therein an alternate embodiment of the present invention. In the embodiment shown in FIG. 6 the moment transferring means, that is the means responsive to a moment exerted to pivot either the first lever 14 or the second lever 16 in a first rotational direction and which serves for transferring a portion of said moment to a respective other of the first lever 14 and the second lever 16 in the first rotational direction, is considerably different than the moment transferring means of the embodiments of FIGS. 2, 4 and 5. In particular, the moment transferring means illustrated in FIGS. 3 and 6 comprises the auxiliary first cylinder 42 but means are now provided for attaching the auxiliary first cylinder 42 to extend from the frame 18 to the first lever 14 at a position such that expansion of the auxiliary first cylinder 42 produces a moment about the first lever pivot 20 which is opposed to the moment produced by expansion of the main first cylinder 30. In the particular embodiment illustrated in FIGS. 3 and 6, the attachment means comprises a crank 104 centrally pivotally mounted at a pivot 106 to the frame 18 with the auxiliary first cylinder 42 being attached to a first end 108 of the crank 104 and the first lever 14 being pivotally attached to a second end 110 of the crank 104. The expansion end 74 of the auxiliary first cylinder 42 is also connected to the frame 18. FIG. 6 illustrates this structure schematically. The auxiliary second cylinder 48 is mounted identically to the second lever 16 as is the auxiliary first cylinder 42 to the first lever 14. In short, a second crank 112 is provided which is centrally mounted at a pivot 114, to the frame 18, the auxiliary second cylinder 48 is pivotally connected to a first end 116 of the crank 112 and the second lever 16 is pivotally connected to the second end 118 of the crank 112. It is noted that expansion of the auxiliary first cylinder 42 or of the auxiliary second cylinder 48 will cause an upward rotation of the respective levers 14 and 16 whereas expansion of the main first cylinder 30 and the main second cylinder 36 will cause a downward rotation of the respective levers 14 and 16. Each of the cylinders are usually mounted so as to exert their forces in vertical alignment with the pivotal connections of the respective roadwheels 26 and 18. It should be noted that as an alternative to use of the cranks 104 and 112, the auxiliary cylinders 42 and 48 can simply be mounted below the levers 14 and 16 in opposition generally to the main cylinders 30 and 36.

Load proportioning valve means 120, shown in both its structural location and in schematic, is provided for proportioning the load between the first roadwheel 26 and the second roadwheel 28. When the first roadwheel 26 and the second roadwheel 28 are level, the load proportioning valve means 120 interconnects a contraction end 122 of the main first cylinder 30 and a contraction end 124 of the auxiliary first cylinder 42 with one another via spool means 126A, a contraction end 128 of the main second cylinder 36 with a contraction end 130 of the auxiliary second cylinder 48 via spool means 126C, the expansion end 66 of the main first cylinder 30 with the expansion end 70 of the main second cylinder 36 via spool means 126, the expansion end 74 of the auxiliary first cylinder with the expansion end of the auxiliary second cylinder via the spool 126B (126A, 126B and 126C centered).

When the first roadwheel 26 is elevated relative to the second roadwheel 28, the rod 60 is moved thereby moving the spools 126A, 126B and 126C leftwardly. In this situation, the expansion end 66 of the main first cylinder 30 is interconnected with the expansion end 74 of the auxiliary first cylinder 42, the contraction end 128 of the main second cylinder 36 is interconnected with the contraction end 130 of the auxiliary second cylinder 48, the contraction end 122 of the main first cylinder 30 is interconnected with the expansion end 78 of the auxiliary second cylinder 48 and the contraction end 124 of the auxiliary first cylinder 42 is interconnected with the expansion end 70 of the main second cylinder 36 responsive to the first roadwheel 26 being elevated relative to the second roadwheel 28. This connection proceed via the spools 126A, 126B and 126C as will be apparent on examination of FIG. 6. What results is increased traction at the second roadwheel 28 and limited upward movement of the frame 18.

When the second raodwheel 28 is elevated relative to the first roadwheel 26 a different interconnection is established. In this situation the rod 60 will be moved rightwardly whereby each of the spools 126A, 126B and 126C will be moved rightwardly. The expansion end 70 of the main second cylinder 36 is thereby interconnected with the expansion end 78 of the auxiliary second cylinder 48. The contraction end 122 of the main first cylinder 30 is interconnected with the contraction end 124 of the auxiliary first cylinder 42. The expansion end 66 of the main first cylinder 30 is interconnected with the contraction end 130 of the auxiliary second cylinder 48 and the expansion end 74 of the auxiliary first cylinder 42 is interconnected with the contraction end 128 of the main second cylinder 36. This results in increased traction at the first roadwheel 26 and limited upward movement of the frame 18.

In the usual manner, the expansion ends of the various cylinders will generally comprise the head ends thereof and thereby a ratio of an expansion area against which the fluid in each of the expansion ends acts to a contraction area (at the rod end) against which the fluid in each contraction end acts is greater than unity. In other words, the cylinders exert a greater force with reduced displacement on their expansion strokes than on their contraction strokes. It will further be noted with respect to the embodiment of FIGS. 3 and 6 that generally a closed fluid system is utilized although, of course, provision may be had for providing fluid makeup.

Through use of the lever arms X and Y in the embodiments of FIGS. 2, 4 and 5 and of the different areas within the expansion ends and contraction ends of the cylinders in the embodiment of FIGS. 3 and 6, a majority of the force being exerted upon one of the wheels of a tandem wheel arrangement is transmitted to the other thereof. In this manner, the wheels going over an obstruction or the like can move over that obstruction in an easier manner. Further, the total up and down motion of the ends of the vehicle to which the tandem wheel arrangement is mounted is significantly reduced through the change in ratio between the displacement of the ascending and discending roadwheels. Also, the shifting of forces leads to increased traction for the lower roadwheel and since the roadwheels are driven this increases control over uneven ground. Further, in the embodiment illustrated in FIG. 5, means are provided whereby the vehicle remains generally level even when working on a slope whereon one side thereof would normally be higher than the other.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The embodiments of the invention in which an exclusive property or privilege is claimed are defined as follows:

1. In a tandem wheel arrangement which comprises a first and a second lever each pivotally mounted to a vehicle frame at first and second lever pivots, respectively, said first and second pivots having generally horizontal axes generally perpendicular to the longitudinal axis of said vehicle frame, said levers extending from a side of said vehicle frame, a first roadwheel mounted for rotation to said first lever and a second roadwheel mounted for rotation to said second lever, each of said roadwheels being longitudinally spaced from the lever pivot thereof, an improvement comprising:

main first cylinder means;
means for attaching said main first cylinder means to extend from said frame to said first lever at a position spaced from said first lever pivot;
main second cylinder means;
means for attaching said main second cylinder means to extend from said frame to said second lever at a position spaced from said second lever pivot;
auxiliary first cylinder means;
means for attaching said auxiliary first cylinder means to extend from said frame to said first lever;
auxiliary second cylinder means;
means for attaching said auxiliary second cylinder means to extend from said frame to said second lever; and
load proportioning valve means for fluid flow interconnecting an expansion end of each of said main first with said main second cylinder means and an expansion end of said auxiliary first cylinder means with an expansion end of said auxiliary second cylinder means responsive to the first and second roadwheels being substantially level, the expansion ends of the main first cylinder means and the auxiliary second cylinder means to sump means and the expansion end of the main second cylinder means with the expansion end of the auxiliary first cylinder means responsive to the first roadwheel being elevated relative to the second roadwheel, and the expansion ends of the main second cylinder means and the auxiliary first cylinder means to said sump means and the expansion end of the first cylinder means with the expansion end of the auxiliary second cylinder means responsive to the second roadwheel being elevated relative to the first roadwheel.

2. An improvement as in claim 1, wherein said main and auxiliary first and second cylinder means each extend generally vertically.

3. An improvement as in claim 1, including:
a source of pressurized fluid; and
vehicle levelling means for directing fluid from said source to and away from said expansion end of each of said main first and main second cylinder means and said auxiliary first and second cylinder means.

4. An improvement as in claim 3, including:
means for mounting said load proportioning valve means adjacent said frame; and
means for activating said load proportioning valve means, said activating means extending from a respective one of said first and second levers to said load proportioning valve means.

5. An improvement as in claim 1, including:
means for mounting said load proportioning valve means adjacent said frame; and
means for activating said load proportioning valve means, said activating means extending from a respective one of said first and second levers to said load proportioning valve means.

6. An improvement as in claim 1, including:
a source of pressurized fluid; and
vehicle levelling means for directing fluid from said source to and away from said expansion end of each of said main first and main second cylinder means.

7. In a tandem wheel arrangement which comprises a first and a second lever each pivotally mounted to a vehicle frame at first and second lever pivots, respectively, said first and second pivots having axes generally perpendicular to the longitudinal axis of said vehicle frame, said levers extending from a side of said vehicle frame, at least one first roadwheel mounted for rotation to said first lever and at least one second roadwheel mounted for rotation to said second lever, each of said roadwheels being longitudinally spaced from its respective lever pivot, an improvement comprising:
main first cylinder means interconnected between said frame and said first lever for extending or retracting in response to pivotal movement of said first lever;
main second cylinder means interconnected between said frame and said second lever for extending or retracting in response to pivotal movement of said second lever; and
means responsive to retraction of said main first cylinder means upon engagement of said first roadwheel with a bump for extending said main second cylinder means to increase a tractive effort of said second roadwheel and to simultaneously limit upward movement of said frame relative to ground level, said main second cylinder extending means including:
auxiliary first cylinder means interconnected between said frame and said first lever;
auxiliary second cylinder means interconnected between said frame and said second lever; and
load proportioning valve means for fluid flow interconnecting expansion ends of said main first with said main second cylinder means and expansion ends of said auxiliary first with said auxiliary second cylinder means responsive to the first and second roadwheels being substantially level, the expansion ends of the main first cylinder means and the auxiliary second cylinder means to sump means and the expansion end of the main second cylinder means with the expansion end of the auxiliary first cylinder means responsive to the first roadwheel being elevated relative to the second roadwheel, and the expansion ends of the main second cylinder means and the auxiliary first cylinder means to said sump means and the expansion end of the first cylinder means with the expansion end of the auxiliary second cylinder means responsive to the second roadwheel being elevated relative to the first roadwheel.

8. An improvement as in claim 7, including:
a source of pressurized fluid; and
vehicle levelling means for directing fluid from said source to and away from said expansion end of each of said main first and main second cylinder means.

9. An improvement as in claim 8, wherein said main auxiliary first and second cylinder means each extend generally vertically.

10. An improvement as in claim 9, including:
means for mounting said load proportioning valve means adjacent said frame; and
means for activating said load proportioning valve means, said activating means extending from a respective one of said first and second levers to said load proportioning valve means.

* * * * *